No. 841,661. PATENTED JAN. 22, 1907.
J. F. BERTRAM.
CHURN DASHER.
APPLICATION FILED NOV. 9, 1905.
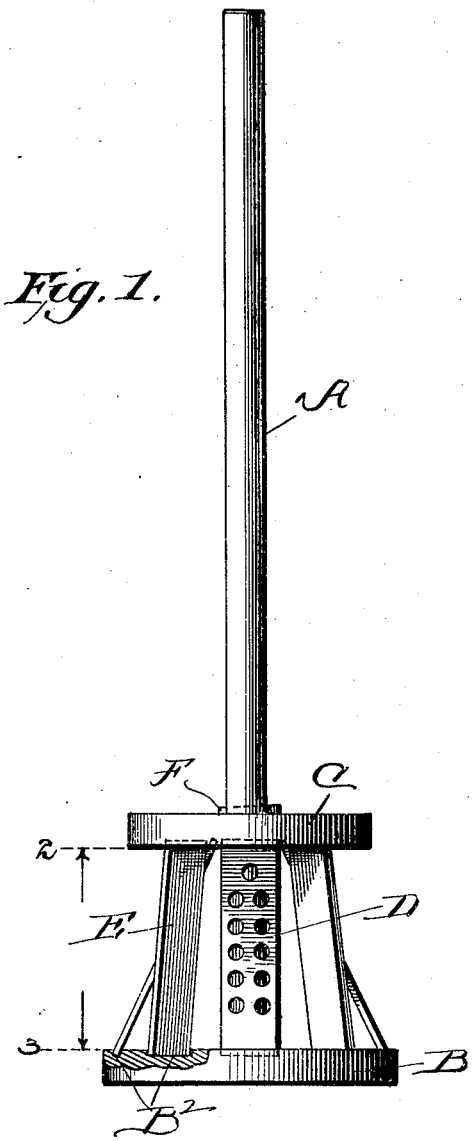
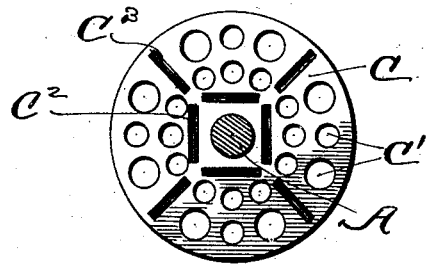
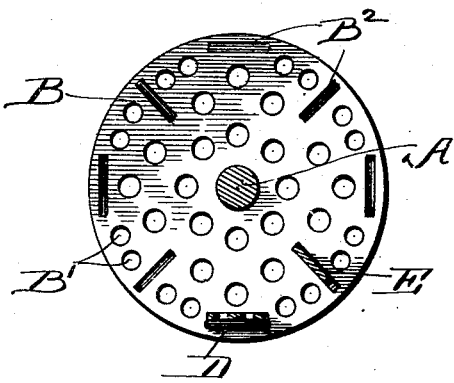
Witnesses
Inventor:
John F. Bertram,
By O'Meara & Brock
Attorneys.

UNITED STATES PATENT OFFICE.

JOHN FREDERICK BERTRAM, OF ST. LOUIS, MISSOURI.

CHURN-DASHER.

No. 841,661. Specification of Letters Patent. Patented Jan. 22, 1907.

Application filed November 9, 1905. Serial No. 286,618.

*To all whom it may concern:*

Be it known that I, JOHN FREDERICK BERTRAM, a citizen of the United States, residing at St. Louis, in the city of St. Louis and State of Missouri, have invented a new and useful Churn-Dasher, of which the following is a specification.

This invention relates to a churn-dasher designed to give a plurality of currents to the cream when moved vertically in the churn.

A further object of the invention is to provide a dasher which can be readily cleaned and which is adapted for use with churns of the ordinary barrel construction.

The invention consists in two concentric disks, the upper one of which is supported above the lower one by a plurality of strips arranged alternately radially and tangentially with respect to the axis of the dasher-rod, the disks and a portion of the strips being perforated.

In the accompanying drawings, Figure 1 is a side vertical elevation of my churn-dasher. Fig. 2 is an inverted plan view of the upper disk, the dasher-rod being shown in section of the line 2 2 of Fig. 1. Fig. 3 is a section of the line 3 3 of Fig. 1, two of the strips being also shown in transverse section.

In the drawings, A represents a dasher-rod, to the lower end of which is secured a disk B, perforated, as shown at B', and having grooves formed in its upper face, as shown at B², a portion of said grooves being tangential with respect to the dasher-rod and each alternate groove being arranged radially with respect to the dasher-rod. An upper disk C is provided with perforations C' and has upon its end face tangentially-arranged grooves C² and radially-arranged grooves C³.
The disk C is centrally perforated to slide upon the dasher-rod A and is supported in position above and concentric with the disk B by means of perforated strips D, the lower ends of which rest in the tangential grooves of the disk B, and their upper ends fit in the similarly-arranged grooves C² of the disk C. Non-perforated strips E have their lower ends resting in the radial grooves B² of the lower disk and their upper ends in the grooves C³ of the upper disk.

It will be understood that the upper disk is of less diameter than the lower disk and that the strips D and E are upwardly and inwardly inclined. To prevent the upper disk from rising upon the dasher-rod while in use, a cotter-pin F is passed through the dasher-rod A and locks the parts together, as shown in Fig. 1. By removing the cotter-pin the disk C can be readily removed from the dasher-rod A and the strips D and E also removed, thus making it easy to thoroughly clean all parts of the dasher.

Having thus fully described my invention, what I claim as new, and desire to secure by Letters Patent, is—

1. A churn-dasher comprising a dash-rod, a disk fixed to the lower end of the rod, a disk slidable on the rod, a plurality of strips resting loosely on the fixed disk and supporting the slidable disk, and means for locking the slidable disk upon the upper ends of the strips.

2. A churn-dasher comprising a dash-rod, two concentric disks carried by the rod, said disks being perforated, the opposing faces of said disks having alternately-arranged radial and tangential grooves, and upwardly and inwardly inclined strips adapted to space the disks apart, the ends of the strips engaging said grooves.

JOHN FREDERICK BERTRAM.

Witnesses:
LEE MARTIN,
ALBERT BUSH.